United States Patent [19]

Bülow

[11] Patent Number: 5,504,610
[45] Date of Patent: Apr. 2, 1996

[54] OPTICAL MIXER AND ITS USE

[75] Inventor: Henning Bülow, Stuttgart, Germany

[73] Assignee: Alcatel N.V., Rijswijk, Netherlands

[21] Appl. No.: 349,066

[22] Filed: Dec. 2, 1994

[30] Foreign Application Priority Data

Dec. 4, 1993 [DE] Germany .................... 43 41 407.9

[51] Int. Cl.⁶ .................................................. H04B 10/12
[52] U.S. Cl. .................... 359/173; 359/156; 359/188; 359/195; 359/192
[58] Field of Search .................................. 359/160, 173, 359/174, 176, 179, 187, 188, 192, 195, 156, 333, 337, 339, 341, 330, 331; 372/6, 39, 40, 41

[56] References Cited

U.S. PATENT DOCUMENTS

| | | | |
|---|---|---|---|
| 5,268,786 | 12/1993 | Matsushita et al. | 359/177 |
| 5,274,495 | 12/1993 | Shirasaki | 359/341 |
| 5,295,013 | 3/1994 | Ono | 359/156 |
| 5,363,385 | 11/1994 | Heidemann | 359/333 |
| 5,386,314 | 1/1995 | Jopson | 359/326 |
| 5,400,164 | 3/1995 | Kurtzke et al. | 359/156 |

FOREIGN PATENT DOCUMENTS 0619658  10/1994  European Pat. Off. .

OTHER PUBLICATIONS

Saruwatari, M. et al., "Optical Signal Processing for Future Communications Networks", NTT Review, vol. 4, No. 6, Nov. 1992 pp. 83 to 91.
"Four–Wave Mixing in an Optical Fiber in the Zero–Dispersion Wavelength Region", Journal of Lighwave Technology, vol. 10, No. 11, Nov. 1992, pp. 1553 to 1561.
Lutzke, Dieter, "Lichtwellenleiter–Technik", Pflaum Verlag, Munche, 1986, pp. 69, 70.
Kawanishi, S. et al, "Ultrahigh-speed phaselocked-loop- -type clock recovery amplifier as a 50 GHz phase detector" Electronics Letters, 16th Sep. 1993, vol. 29, No. 19, pp. 1714–1716.
Electronic Letters, 23 May 1991, UK, vol. 1, 27, Nr. 11, pp. 922–924 issn 0013–5194 Andrekson P. A. et al "16 Gbit/s all optical demultiplexing using four–wave mixing".
Electronics Letters, 24 Sep. 1992, UK, vo. 28, Nr. 20, pp. 1864–1866, ISSN 0013–5194, Uchiyama K. et al. "Ultrafast polarisation–independent all–optical switching using a polarisation diversity scheme in the nonlinear optical loop mirror".
Electronic Letters, 17 Sep. 1993 UK, vol. 29, Nr. 19, pp. 1708–1710 ISNN 0013–5194 Inoue K. et al. "Multichannel frequency conversion experiment using fibre four–wave mixing".
IEEE Photonics Technology Letters, Jan. 1992, USA, vol. 4, NR, pp. 76–79, ISSN 1041–1135 Andrekson P. A. et al. "32 Gb/s optical soliton data transmission over 90 km".
Electronic Letters, 12 May 1994, UK, vol. 1, 6, 30 Nr. 10, pp. 800–801, ISSN 0013–5194, Kawanishi S. et al. "100 Gbit/s, 200 km optical transmission experiment using extremely low jitter PLL timing extraction and all–optical demultiplexing based on polarisation insensitive four–wave mixing".

Primary Examiner—Leo Boudreau
Assistant Examiner—Bhavesh Mehta
Attorney, Agent, or Firm—Ware, Fressola, Van Der Sluys & Adolphson

[57] ABSTRACT

The optical mixer (1) contains a polarization-maintaining length of optical waveguide (4) as a mixing element. The pump light (P) is coupled to the optical mixer in so that its plane of polarization makes an angle of 45° with the principal axes of the length of optical waveguide (4). One advantage of this optical mixer (1) is that the optical power of the mixing product (M) depends not on the polarization of the signal light (S), but only on the phase relationship between signal light and pump light. The mixer can be used to advantage in an optical phase-locked loop.

8 Claims, 2 Drawing Sheets

OPTICAL MIXER AND ITS USE

TECHNICAL FIELD

The present invention relates to an optical mixer and to its use. It further relates to an optical phase-locked loop.

BACKGROUND OF THE INVENTION

The invention is connected with optical communication systems in which digital signals are to be transmitted at a high bit rate, e.g., 40 Gb/s. At such a high bit rate, electrical system components must be optimized at high cost. Above an upper cutoff frequency, some electrical system components, such as devices for clock recovery, are no longer usable.

A device for clock recovery is, for example, an optical phase-locked loop as is known, for example, from Saruwatari, M. et al, "Optical Signal Processing for Future Communications Networks", NTT Review, Vol. 4, No. 6, November 1992, pages 83 to 91.

FIG. 2 of that article shows an optical phase-locked loop (PLL) which includes a laser-diode amplifier (LDA) used as a phase detector, an oscillator (VCO), and an optical clock generator. An experimental result for a 10 Gb/s signal is shown, and the circuit is expected to operate at up to 100 Gb/s.

The laser-diode amplifier mixes the signal light of wavelength $\lambda_1$ with light of wavelength $\lambda_2$ which is emitted by the optical clock generator. The laser-diode amplifier is thus an optical mixer for a communications system. The upper cutoff frequency of the optical phase-locked loop is determined primarily by the cutoff frequency of the laser-diode amplifier.

This optical phase-locked loop is disadvantageous in that the clock signal used for mixing, which is generated by the optical clock generator, has a frequency slightly different from that of the signal light, namely 10.0001 GHz.

It is an object of the invention to provide another optical phase-locked loop. This object is attained by an optical phase-locked loop comprising an optical clock generator, which has an optical mixer and a control section which converts light emerging from the optical mixer and composed of signal light, pump light, and a mixing product into an electric control signal corresponding to an intensity difference between the signal light and the mixing product, and that the optical clock generator, which is controlled by the control signal, is connected to the optical mixer, so that the latter receives a portion of the optical clock as the pump light.

It is another object of the invention to provide an optical mixer for a communications system, comprising a length of optical waveguide as a mixing element and a coupler for coupling signal light and pump light into a first end of the length of optical waveguide, from whose second end emerges the signal light, the pump light, and a mixing product thereof, that the length of optical ;waveguide is polarization-maintaining, and that the pump light, which is plane-polarized, is coupled into the length of optical waveguide so that its plane of polarization makes an angle of approximately 45° with the principal axes of the length of optical waveguide. It is also directed to the use of the optical mixer as an optical phase-locked loop.

Further advantageous aspects of the invention are claimed in the subclaims.

The invention uses the four-wave mixing principle. This principle is known, for example, from Inoue, Kyo, "Four-Wave Mixing in an Optical Fiber in the Zero-Dispersion Wavelength Region", Journal of Lightwave Technology, Vol. 10, NO. 11, November 1992, pages 1553 to 1561.

There, an experimental setup is shown with which four-wave mixing (FWM) in a fiber can be examined. Four-wave mixing is an unwanted phenomenon which causes system degradation, particularly in multichannel transmissions.

The experimental setup includes a signal laser, a pump laser, a coupler, and a fiber to be tested. The light resulting from the mixing in the fiber is analyzed in a spectrum analyzer. To ensure that the amount of power of the signal and pump lights in the fiber is large enough, the signal and pump lights are amplified by means of optical amplifiers before entering the coupler. The resulting mixing is referred to as "degenerate four-wave mixing", and the mixing product as "fourth wave". To maximize the optical power of the mixing product, the polarization states of the signal and pump lights are varied by means of a polarization controller.

BRIEF DESCRIPTION OF THE DRAWINGS

The invention will now be explained in more detail, by way of example, with reference to the accompanying drawings, in which.

BEST MODE FOR CARRYING OUT THE INVENTION

Figure 1:
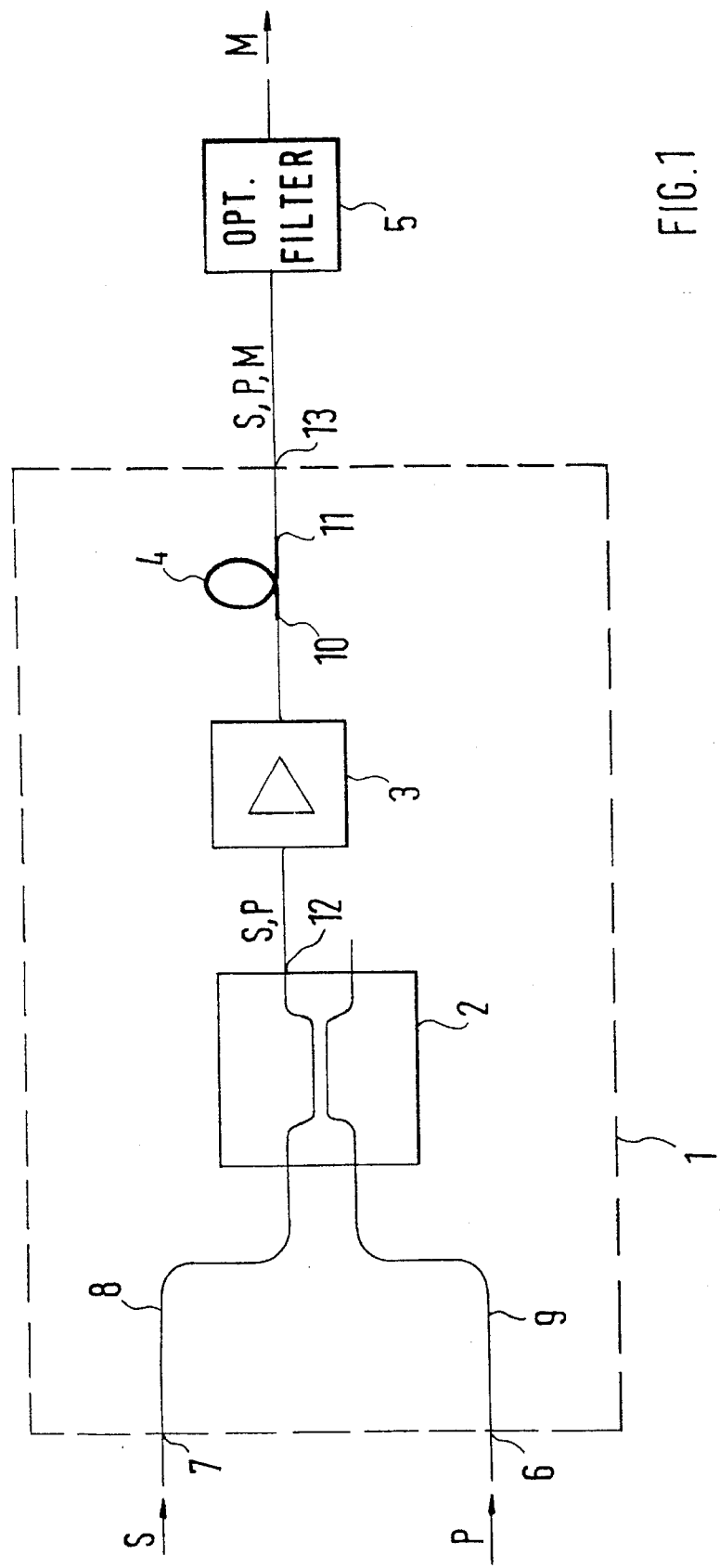
FIG. 1 shows an embodiment of an optical mixer (1)

The optical mixer 1 of FIG. 1 has a first input 7, which receives signal light S, a second input 6, which receives pump light P, and an output 13, at which the signal light S, the pump light P, and a mixing product M are available. In accordance with the literature (Inoue, Uyo), the term "pump light" is used here although no pumping takes place as is the case with semiconductor lasers. The mixing product M is obtained by four-wave mixing, as was stated above. The optical mixer 1 further includes a coupler 2, which is fed with the signal light S and the pump light P over two feed waveguides 8, 9, as well as an optical amplifier 3 and a length of optical waveguide 4, which has two ends 10, 11. The optical amplifier 3, which can be dispensed with under certain circumstances, is connected to an output port 12 of the coupler 2 and to the first end 10 of the length of optical waveguide 4. The output 13 of the optical mixer 1 is connected to an optical filter 5 which blocks the signal light S and the pump light P. The coupler 2 is, for example, a conventional fiber-optic coupler or a wavelength-division multiplexer.

The length of optical waveguide 4 is polarization-maintaining, i.e., in, it, the polarization of an optical signal remains unchanged during propagation. Polarization-maintaining lengths of optical waveguide are known from Lutzke, Dieter, "Lichtwellenleiter-Technik", Pflaum Verlag, München 1986, pages 69, 70. The length of optical waveguide 4 can be implemented with silica fibers, fibers of higher optical nonlinearity, such as rare-earth- or lead-doped silica or fluoride fibers, or plastic fibers (polymers).

At their places of origin, the signal light S and the pump light P are plane-polarized, since they are commonly produced by a semiconductor laser. The fact that the output light of semiconductor lasers is plane-polarized is known from the above-cited book by Lutzke, page 224.

The optical amplifier 3 serves to increase the total optical power in the length of optical waveguide 4. It may be an erbium-doped fiber amplifier (EDFA) or a semiconductor laser amplifier, for example. It is also possible to increase the optical power by placing optical amplifiers in the feed waveguides 8, 9.

In order for this optical mixer 1 to be independent, in accordance with the invention, of the signal polarization, which may be arbitrary after transmission over a fiber-optic link, the pump light P, which is plane-polarized, is coupled into the length of optical waveguide in such a way that its optical power is divided equally between the principal axes of the length of optical waveguide. This can be accomplished by arranging that the plane of polarization of the pump light makes an angle of approximately 45° with the principal axes of the length of optical waveguide. This orientation of the plane of polarization of the pump light coupled into the length of optical waveguide 4 relative to the principal axes may be fixed either directly at the first end 10 of the length of optical waveguide 4 or before the coupler 2 within the second feed waveguide 9. In the latter case, the polarization of the pump light P must not change again; the coupler 2 and the optical amplifier 3 must therefore be polarization-maintaining. The orientation of the polarization is fixed, for example, by splicing two polarization-maintaining optical waveguides together, with one of them rotated 45° about the longitudinal axis.

Figure 2:
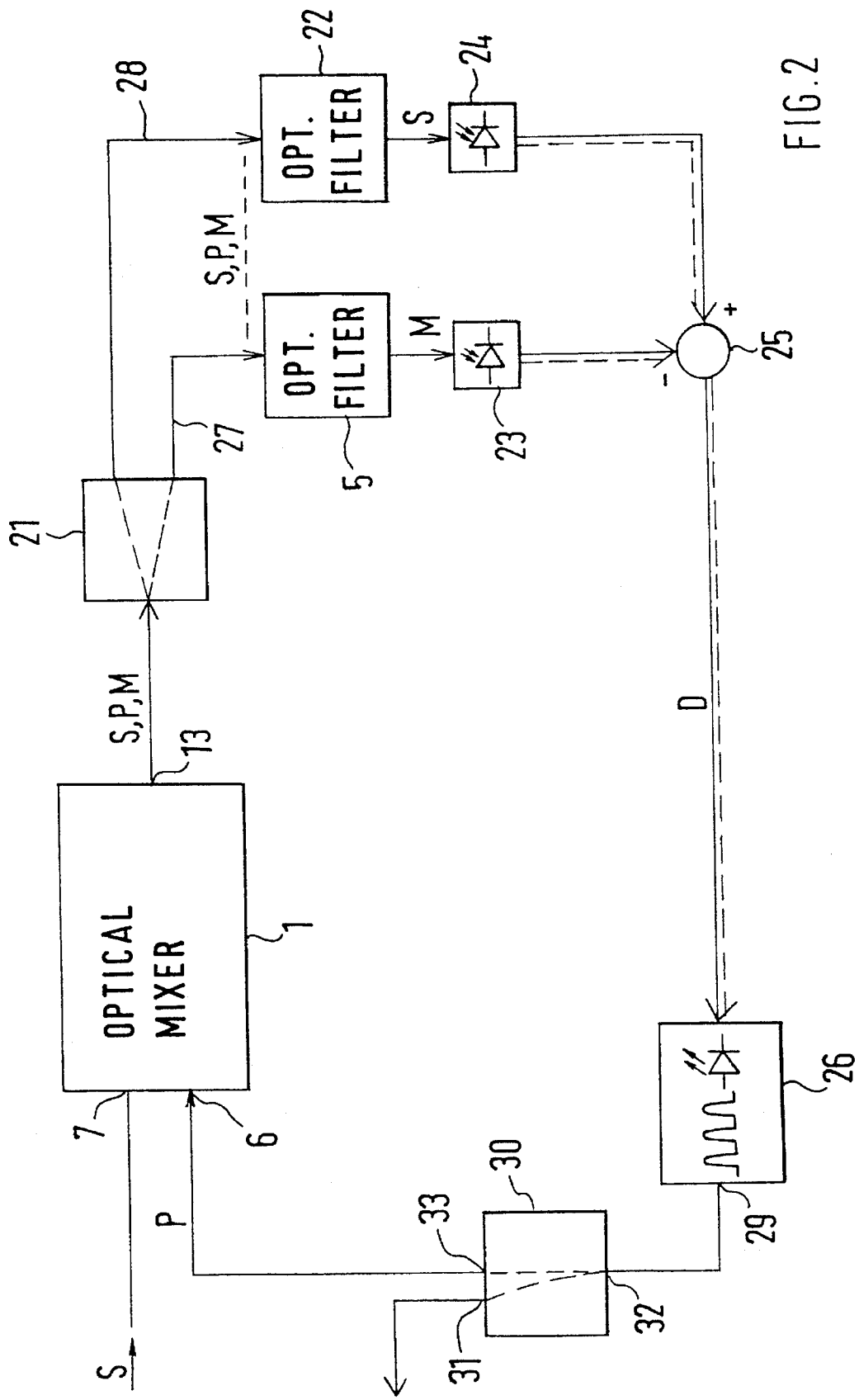
FIG. 2 shows an exemplary use of an optical mixer (1) in an optical phase-locked loop.

FIG. 2 shows a use of the optical mixer of FIG. 1 in an optical phase-locked loop. Here the pump light P is a train of optical pulses which occur at an adjustable repetition rate. The signal light is also a train of optical pulses, but with a predetermined repetition rate, also called "pulse frequency". The function of this optical phase-locked loop is to lock, or synchronize, the local clock frequency of the loop, which is equal to the pulse repetition rate of the pump light P, with the pulse frequency of the signal light S.

This optical PLL comprises an optical mixer 1, two couplers 21, 30, two optical filters 5, 22, two photodetectors 23, 24, a subtracter 25, and an optical clock generator 26, which has an output 29.

These elements are arranged as follows and have the following functions:

The coupler 21 is connected to the output of the optical mixer 1 and divides the output light of the latter, which is composed of the signal light S, the pump light P, and the mixing product M, equally between two arms 27, 28.

One of the arms contains the first optical filter 5, which blocks the signal light S and the pump light P, and the subsequent first photodetctor 23, which provides an electric signal corresponding to the mixing product M.

The other branch contains the second optical filter 22, which blocks the pump light P and the mixing product M, and the subsequent second photodetector 24.

Both arms 27, 28 end at the subtracter 25, which provides a difference signal D that is applied to the optical clock generator 26.

The output 29 of the optical clock generator 26 is coupled to an input port 32 of the second coupler 30, which has two output ports 31, 33, one of which is connected to an input 6 of the optical mixer 1. A portion of the optical clock signal emitted by the optical clock generator is thus fed as pump light P to the optical mixer 1. Another portion is the optical clock synchronized with the pulse frequency of the signal light by the phase-locked loop.

The photodetectors 23, 24 convert the optical powers of the signal light S and the mixing product M into electric signals. Connections between the individual elements over which no optical transmission, but electrical transmission takes place, are marked by additional, dashed lines.

The subtracter 25 forms the difference of the optical powers of the signal light S and the mixing product M. The signal light S represents a reference signal, with which the mixing product M is compared. Any change in the difference signaled provided by the subtracter 25 is thus caused by a change in the optical power of the mixing product M. Since the optical power of the mixing product M changes only as a result of a change in the phase difference between the signal light pulse train and the pump light pulse train, the difference signal D can be used to control the optical clock generator 26, whose output represents the pump light P. The optical clock generator 26 is, for example, a laser diode which converts current pulses generated by an electronic pulse generator to light pulses. Such a clock generator is known, for example, from Kawanishi, S. et al, "Ultrahigh-speed phaselocked-loop-type clock recovery circuit using a travelling-wave laser diode amplifier as a 50 GHz phase detector", Electronics Letters, Sep. 16th, 1993, Vol. 29, No. 19, pages 1714 to 1716.

The pulse repetition rate of the pump light P is varied in accordance with the difference signal D until the signal light S and the pump light P are in synchronism. The optical phase-locked loop is designed so, for example, that the pulse repetition rate increases with increasing difference signal D.

The first coupler 21, the first and second arms 27, 28, the first and second optical filters 5, 22, the first and second photodetectors 23, 24, and the subtracter 25 together form a control section which derives the electric control signal D corresponding to an intensity difference between signal light S and mixing product M.

The optical mixer can thus be used in an optical phase-locked loop.

Another use of the optical mixer is for the polarization-independent optical sampling of an unknown signal. To this end, the optical mixer is fed with the unknown signal as the signal light S and with the pump light P. The pump light P consists of very short optical pulses.

Here, the mixing product of the optical mixer depends primarily on the optical power of the unknown signal. The unknown signal is thus sampled at discrete time intervals with very short optical pulses, so that with each optical pulse a mixing product is obtained whose optical power represents the optical power of the unknown signal at this point in time. Thus, the time characteristic of the optical power of the unknown signal can be simulated.

The polarization-independent optical mixer can also be used to synchronize fast optical add/drop multiplexers, the optical switch being implemented, for example, with a nonlinear optical fiber loop mirror (NOLM).

I claim:

1. An optical mixer (1) for a communications system, characterized in that it comprises a length of optical waveguide (4) as a mixing element and a coupler (2) for coupling signal light (S) and pump light (P) into a first end (10) of the length of optical waveguide (4) having principal axes, from whose second end (11) emerges the signal light (S), the pump light (P), and a mixing product (M) thereof, that the length of optical waveguide (4) is polarization-maintaining and that the pump light (P), which is plane-polarized, is coupled into the length of optical waveguide (4) so that its plane of polarization makes an angle of approximately 45° with the principal axes of the length of optical waveguide (4), whereby the optical power of the pump light is divided substantially equally between the principal axes of the length of optical waveguide (4).

2. An optical mixer (1) as claimed in claim 1, characterized in that the second end (11) of the length (4) of optical waveguide is connected to an optical filter (5) which blocks the signal light (S) and the pump light (P).

3. An optical mixer (1) as claimed in claim 1, characterized in that the length of optical waveguide (4) is of plastic.

4. An optical mixer (1) as claimed in claim 1, characterized in that the length of optical waveguide (4) is doped with a rare-earth element.

5. An optical mixer (1) as claimed in claim 1, characterized in that the length of optical waveguide (4) is doped with lead.

6. Use of an optical mixer (1) as claimed in claim 1 in an optical phase-locked loop.

7. Use of an optical mixer (1) as claimed in claim 6 wherein in a control section (21, 27, 28, 5, 22, 23, 24, 25), an electric control signal (D) for an optical clock generator (26) is derived from light emerging from the optical mixer (1), which is composed of the signal light (S), the pump light (P), and the mixing product (M), said electric control signal (D) corresponding to an intensity difference between the signal light (S) contained in the output light of the optical mixer (1) and the mixing product (M) contained in said signal light, and wherein a portion of the optical clock emitted by the optical clock generator (26) is fed as the pump light (P) to the optical mixer (1).

8. An optical phase-locked loop comprising an optical clock generator (26), characterized in that it has an optical mixer (1) as claimed in claim 1 and a control section (21, 27, 28, 5, 22, 23, 24, 25) which converts light emerging from the optical mixer (1) composed of signal light (S), pump light (P), and a mixing product (M) into an electric control signal (D) corresponding to an intensity difference between the signal light (S) and the mixing product (M), and that the optical clock generator (26), which is controlled by the control signal (D), is connected to the optical mixer (1), so that the latter receives a portion of the optical clock as the pump light (P).

* * * * *